US008905589B2

(12) United States Patent
Stolte et al.

(10) Patent No.: US 8,905,589 B2
(45) Date of Patent: Dec. 9, 2014

(54) LED LUMINAIRE THERMAL MANAGEMENT SYSTEM

(75) Inventors: Brandon A. Stolte, Lindenhurst, IL (US); Kevin S Dahlen, Lindenhurst, IL (US); James Hawkins, Lake Bluff, IL (US)

(73) Assignee: Kenall Manufacturing Company, Gurnee, IL (US)

( * ) Notice: Subject to any disclaimer, the term of this patent is extended or adjusted under 35 U.S.C. 154(b) by 212 days.

(21) Appl. No.: 13/005,288

(22) Filed: Jan. 12, 2011

(65) Prior Publication Data

US 2012/0176797 A1 Jul. 12, 2012

(51) Int. Cl.

| | |
|---|---|
| ***F21V 29/00*** | (2006.01) |
| ***B60Q 1/06*** | (2006.01) |
| ***F21V 3/02*** | (2006.01) |
| ***F21V 15/01*** | (2006.01) |
| ***F21S 8/04*** | (2006.01) |
| *F21Y 105/00* | (2006.01) |
| *F21Y 101/02* | (2006.01) |

(52) U.S. Cl.

CPC ................. *F21V 29/004* (2013.01); *F21V 3/02* (2013.01); *F21V 29/2293* (2013.01); *F21V 15/011* (2013.01); *F21S 8/04* (2013.01); *F21Y 2105/001* (2013.01); *F21V 29/262* (2013.01); *F21V 29/2262* (2013.01); *F21Y 2101/02* (2013.01)

USPC .......................................... 362/294; 362/373

(58) Field of Classification Search

USPC .................................................. 362/294, 373

See application file for complete search history.

(56) References Cited

U.S. PATENT DOCUMENTS

| | | | | |
|---|---|---|---|---|
| 4,729,076 | A | 3/1988 | Masami et al. | |
| 7,549,774 | B2 * | 6/2009 | Tsai | 362/294 |
| 7,593,229 | B2 | 9/2009 | Shuy | |
| 7,604,380 | B2 | 10/2009 | Burton et al. | |
| 7,611,264 | B1 * | 11/2009 | Chang et al. | 362/249.02 |
| 7,682,055 | B2 | 3/2010 | Shuai et al. | |
| 7,712,925 | B2 * | 5/2010 | Russell | 362/294 |
| 7,775,692 | B2 | 8/2010 | Li | |
| 7,810,965 | B2 * | 10/2010 | Weaver | 362/373 |
| 7,828,465 | B2 | 11/2010 | Roberge et al. | |
| 7,832,898 | B2 | 11/2010 | Li | |
| 7,857,497 | B2 | 12/2010 | Koike et al. | |
| 7,862,210 | B2 | 1/2011 | Zhang et al. | |
| 7,866,847 | B2 | 1/2011 | Zheng | |
| 7,874,699 | B2 * | 1/2011 | Liang | 362/249.02 |
| 7,874,700 | B2 | 1/2011 | Patrick | |
| 7,918,587 | B2 * | 4/2011 | Hsu et al. | 362/294 |
| 7,959,329 | B2 * | 6/2011 | Van De Ven | 362/373 |

(Continued)

OTHER PUBLICATIONS

Electromatic Products, High Light Low Energy LED Lighting. Advertising Brochure, before Dec. 20, 2010 2 pages.

(Continued)

*Primary Examiner* — David J Makiya

(74) *Attorney, Agent, or Firm* — Marshall, Gerstein & Borun LLP; Randall G. Rueth

(57) ABSTRACT

A thermal management and heat transfer system for light fixtures. And in particular, light fixtures comprising LED lights requiring lower temperatures than those required by incandescent of neon based light fixtures. The heat transfer includes taking advantage of the thermal updrafts caused by free convection of waste heat to cool the fixture.

15 Claims, 4 Drawing Sheets

(56) References Cited

U.S. PATENT DOCUMENTS

| | | | | |
|---|---|---|---|---|
| 7,972,036 | B1 | 7/2011 | Schach et al. | |
| 7,976,197 | B2 | 7/2011 | Chen | |
| 8,157,422 | B2 * | 4/2012 | Paik et al. | 362/294 |
| 8,164,237 | B2 * | 4/2012 | Wen | 313/46 |
| 8,226,273 | B2 * | 7/2012 | Lai | 362/294 |
| 8,235,097 | B2 * | 8/2012 | Scordino et al. | 165/122 |
| 8,272,765 | B2 | 9/2012 | Ter-Hovhannisyan | |
| 2009/0046473 | A1 | 2/2009 | Tsai et al. | |
| 2009/0296387 | A1 * | 12/2009 | Reisenauer et al. | 362/235 |
| 2010/0091487 | A1 * | 4/2010 | Shin | 362/235 |
| 2010/0124058 | A1 * | 5/2010 | Miller | 362/249.02 |
| 2010/0172143 | A1 * | 7/2010 | Cunius | 362/373 |
| 2011/0110095 | A1 * | 5/2011 | Li et al. | 362/294 |
| 2011/0260599 | A1 * | 10/2011 | Qiu | 313/46 |

OTHER PUBLICATIONS

American Electric Lighting, LEDR LED Roadway. Advertising Brochure, before Dec. 20, 2010, 12 pages.

Dialight, DuroSite LED High Bay. Advertising Brochure, before Dec. 20, 2010. 8 pages.

Dialight Corporation, DuroSite_LED_Lowbay, Press Release, Apr. 5, 2011, 1 page, Dialight Website.

Dialight Corporation, DuroSite_highbay_dlc, Press release, Aug. 25, 2010, 1 page, Dialight Website.

Dialight Corporation, DuroSite, LED Low Bay Fixture, unknown publication date, 2 pages, Dialight Website.

Philips Corporation, Canlyte product brochure, unknown date, 16 pages—reference p. 7, Canlyte a Philips Group Brand, Printed in Canada.

* cited by examiner

LED LUMINAIRE THERMAL MANAGEMENT SYSTEM

CROSS REFERENCE TO RELATED APPLICATIONS

None.

FIELD OF THE INVENTION

The present invention relates to modular lighting systems and in particular a system for thermal management in LED based luminaires typically used in high output lighting structures.

BACKGROUND OF THE INVENTION

Light emitting diodes (LED) are an area of interest in the lighting industry due to energy savings among other desirable attributes. More and more legislation is demanding implementation of such systems to replace typical tungsten filament (incandescent) or neon based light structures.

The technology for LED based lighting systems is new and, as such, has constraints which need to be accommodated. For example, conventional incandescent bulbs are designed to accommodate a tungsten filament brought to over 2000° C. through resistive heating inside a vacuum chamber. As such, temperatures on the surface of the bulb can reach many hundreds degrees Celsius, for which black body radiation is an important source of cooling in addition to convection cooling. Over the years such lighting systems have been designed to accommodate these higher temperatures.

An LED lighting system, while generating less waste heat, is much more sensitive to temperatures than those found in incandescent bulbs just explained. And those designing LED lighting systems should strive to efficiently remove whatever waste heat is generated.

An LED light system is typically based on a 3-5 semiconductor doping structure. The 'three' designates elements with 3 electrons in an outer valance p shell and five elements are those having 5 electrons in the outer shell. Both elements are most stable chemically with 4 electrons in the shell. When 3 groups and 5 groups are put into close proximity to one another within a substrate, a diode junction is formed as electrons diffuse to fill shells in the 3 group generating an electric field. As an external voltage is applied, electrical current is passed across the junction and under the proper conditions some of the electrical energy is converted to light energy. A fundamental constraint of such systems is that a thermal leakage current component is introduced as temperatures increase. Such currents can disrupt the control of the current voltage relationship used in the control of the LED's light output. Commercial semiconductor devices, for example, are designed to operate with the diode junction temperature well below where black body radiation is significant. Therefore, it is important that both convective and conductive heat transfer principles be used to eliminate waste heat.

The present solution comprises a system of providing thermal backplanes for conduction of waste heat away from an LED or a cluster of LEDs, and toward a manifold employing a passive convective heat transfer system. The manifold comprises multiple chambers being formed by fins projecting inward from an outer cincture or perimeter skirt located about the radial perimeter of the fixture. The perimeter skirt, in addition to creating improved aesthetics by hiding the heat transfer fins, also provides constriction for the airflow and an additional heat transfer surface.

Heat generated through operation warms the surrounding air causing it to rise. This is generally referred to as free convection of a fluid. Free convection can be defined as a passive transfer of heat into a fluid (generally the air) causing differences in density of air that thereby causes the flow of air generally in an upward direction or draft. Cooler air from below rises due to the pressure differential and, in one aspect of the invention, is channeled by a light cover toward a manifold where it is concentrated into a laminar flow directed toward the manifold.

The manifold, comprising a multiple of fins projecting inwardly from the perimeter skirt, constricts the flow at the inlet which then opens up shortly thereafter and by means explained by the Bernoulli's Principle increases the velocity of air across the fins. Under a special set of conditions, the Bernoulli's Principle is manifest as what is known as the Venturi effect.

The fins, in addition to the mechanism explained above, receive heat by thermal conduction from a backplane. In one aspect of the invention, the constriction is followed by an opening or deconstruction. The increased velocity due to the Venturi effect followed by an expansion just beyond the constriction which transitions the flow from laminar to turbulent flow which further enhances the thermal flux to maximize the removal of heat from the fins. Such concentrated and accelerated flows can be referred to here as induced convection heat transfer. To induce generally means to "move by persuasion or influence; to call forth or to bring about by influence or stimulation". Therefore induced convection can be viewed as "Heat convection in which fluid motion is persuaded or enhanced or influenced by some external agency beyond that provided by free convention". For present purposes, induced convection can be seen as similar to a forced convection, but without need for motorized or other such mechanical means for stimulating enhanced fluid motion.

In one aspect of this invention a flow with a velocity of between 1 to 2 feet per second can be induced in the region of interest across the fins. This higher velocity flow creates an increased heat flux from the perimeter skirt and the outer perimeter of the fins. In one aspect of the invention heat flux of between 200 to 300 Watts per square meter can be generated. Cooling across the fins caused by the high heat flux creates a high temperature gradient across the fins. In one aspect of the invention, a temperature gradient between 6-7° C. can be generated across each manifold fin, with the lowest temperature being in the perimeter region. Having such a high temperature gradient causes heat to be drawn into the region of high velocity flow and high heat flux.

Those skilled in the art will recognize that the foregoing explanation is for illustrative purposes regarding one aspect of the invention and is not limiting in any way upon the principles taught herein. Further, in this scheme it is anticipated that the higher the temperatures the more active the induced convective cooling becomes.

It is therefore an object of the invention to provide a passive heat transfer thermal management system for a light fixture.

It is therefore an object of the invention to provide a heat transfer system taking advantage of the convective updraft generated by waste heat from the light fixture.

It is another object of the invention to provide a heat transfer system taking advantage of both conductive and convective heat transfer.

It is another object of the invention to provide a heat transfer manifold to aid in convective heat transfer.

It is another object of the invention that this manifold structure provides a thermal perimeter skirt for aiding in heat transfer.

It is another object of the invention that this manifold structure provides multiple chambers comprising vertical fins to aid in heat transfer.

It is another object of the invention that this manifold structure be designed to utilize a venturi effect flow to facilitate cooling.

It is another object of the invention to provide a cooling system for inducing convective heat transfer without mechanical means.

It is another objective of the invention to provide a pleasingly aesthetic cooling system for a light fixture.

It is another objective of the invention to provide a cooling system for a light fixture which is low maintenance.

It is another objective of the invention that the cooling system will work with luminaires that can illuminate large open spaces and provide adequate illumination to those spaces.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION

Figure 1:
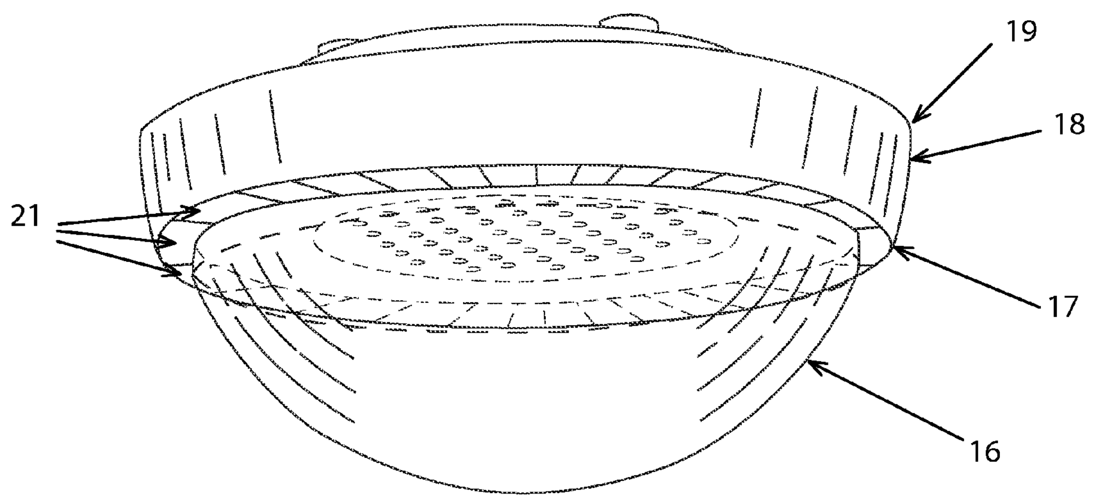
FIG. 1 is a perspective view of one embodiment of a light fixture of the present invention.
Figure 2:
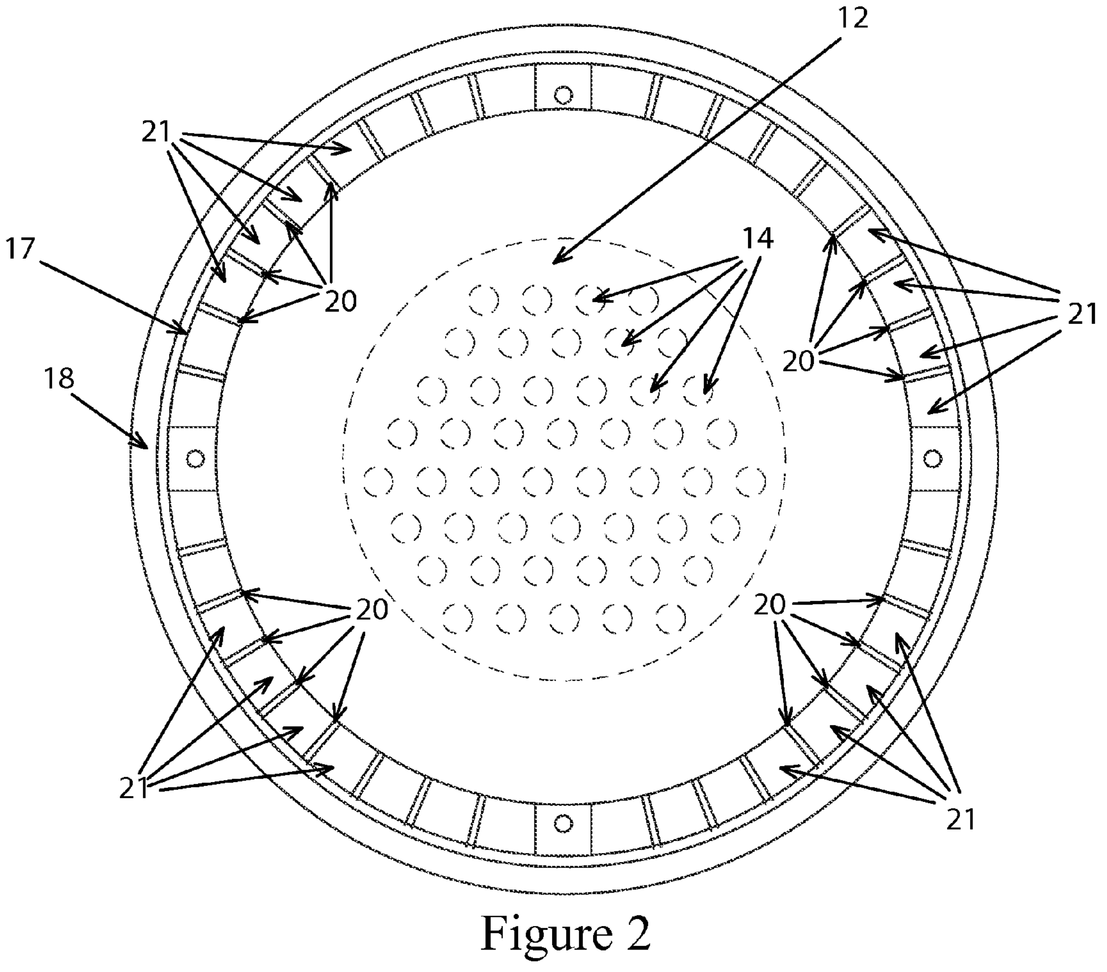
FIG. 2 is a bottom view of the present invention.
Figure 3:
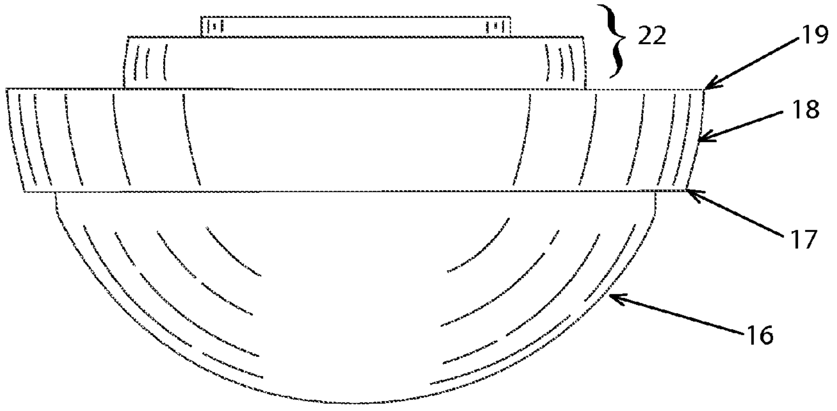
FIG. 3 is a side view of the present invention.

Referring to FIGS. 1-3, there is provided a light fixture (10) generally 14 to 20 inches in diameter having a manifold structure (30), and in this case a 17 inch diameter fixture was chosen. The light fixture (10) comprises at least one light source, which in this case is generally denoted as light emitting diodes LEDs (14). In this case an array of 48 LEDs (44) was chosen. For simplicity only a few exemplary samples are pointed out. The LEDs (14) are arranged in an array (12). A mounting base (22) providing mounting structures (not shown) and power source interface and control electronics (also not shown) are provided to facilitate providing lighting from the fixture.

Additionally, two of the features, as seen from a ground perspective view, are provided in an aesthetically pleasing way. They are an array covering (16) and a skirt (18), both providing additional functionality as will be explained hereafter. The array covering (16) is generally translucent and is can also be modified to provide functionality as a focusing lens or a diffusing lens in order to better focus or distribute light from the LED array (12) and into the intended space. The covering (16) can be seen as generally inclined from a minimum point in the center of the array (12) and upward toward the skirt (18). The preferred form for the covering (16) in the example is substantially hemispherical, as this will provide laminar flow is such a way as to maximize inlet velocities and ultimately cooling capability. It is anticipated that those skilled in the art can appreciate that there are many suitable implementations of an inclined covering (12) for channeling an updraft of air. The skirt (18) forms a; rim, periphery, cincture, encasement, edging, or environs for the area encircled. In another aspect it also forms a part of the heat transfer surface area.

Figure 4:
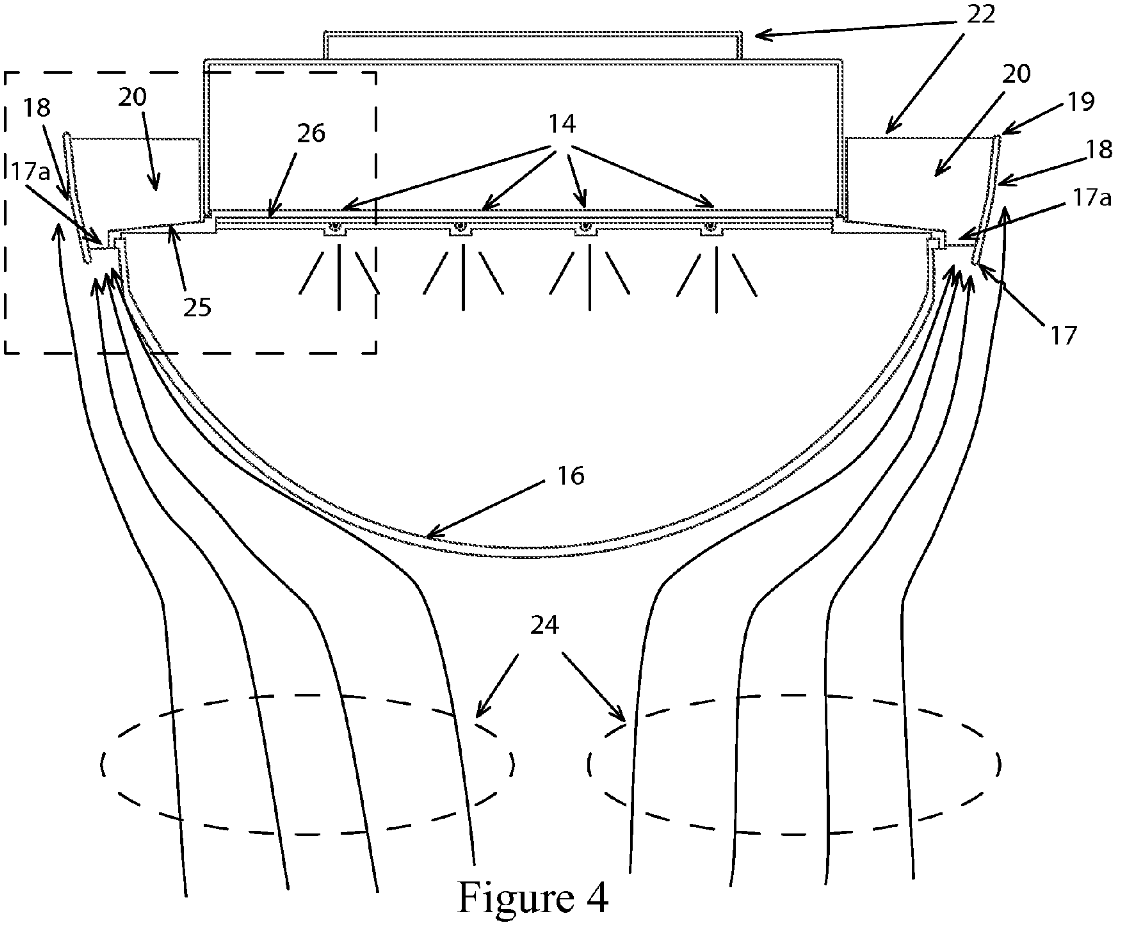
FIG. 4 is a cross-sectional view highlighting airflow patterns generated by the light fixture.
Figure 5:
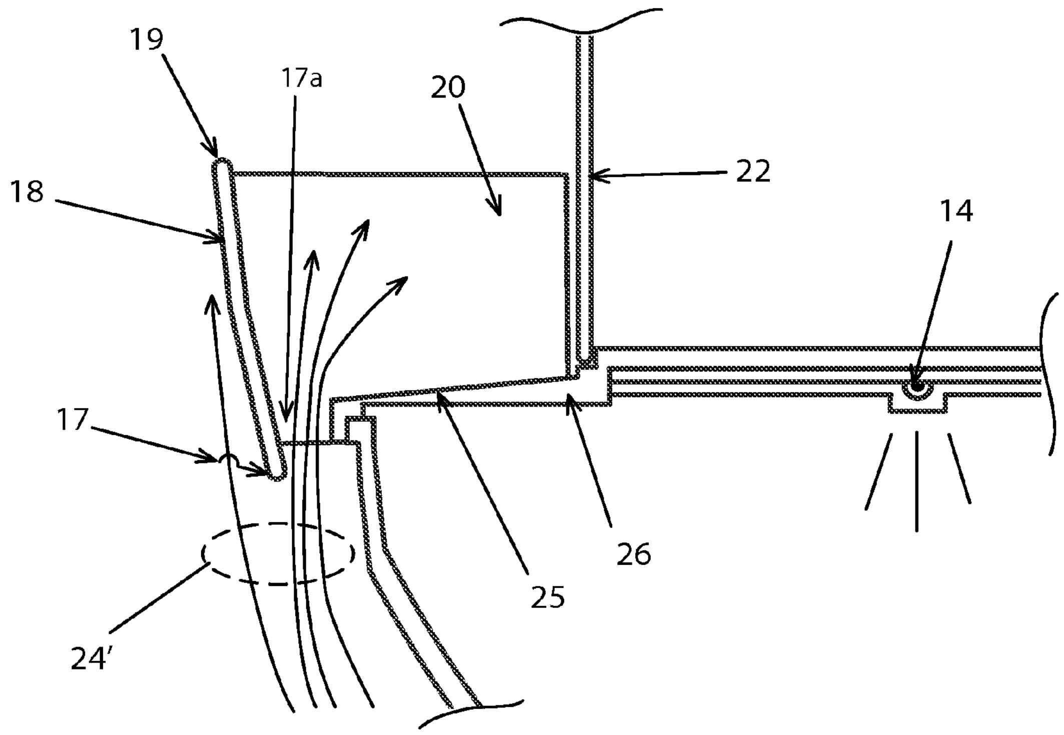
FIG. 5 is a close-up view of the light fixture of FIG. 4.

As seen in FIG. 4, heat from the LEDs (14) is conducted outward heating the thermal backplane (26), the fins (20) and the skirt (18) by means of conductive heat transfer. This heat combined with heat generated in the mounting base (22) causes an updraft of air (24) from below which is directed by the covering (16) toward a manifold structure (30) which generally comprises the skirt (18) and the fins (20). It is anticipated that the heated air will comprise a laminar flow diverging or deflecting from the center of the array covering (16) and concentrating near the inlet (24') of the manifold as seen in FIG. 5. The manifold (30) can be defined as comprising; a bottom (17), wall (18), top outlet (19), fins (20) and thermal backplane (26) which form a series of chambers (21), roughly 32 to 40 chambers (21) being approximately ¾inch by 2 inches in cross section in this example. Further, the bottom (17) and the wall of the skirt (18) are arranged with respect to the edge of the thermal backplane (25) to form a constriction (**17*a*) causing a venturi effect which lowers pressure and increases flow through the chambers (21) of the manifold (30) which opens up prior to reaching the top outlet (19). The opening, which for present purposes is formed between the skirt (18) and the mounting base (22) and shown in FIG. 5 is an approximate seven fold expansion between the constriction (17*a*) and the top outlet (19) as seen by the cross section of a fin (20). It is also anticipated that the skirt (18) and the fins (20**) can be formed as one structure of cast metal, such as cast aluminum.

Heat which is carried by the backplane (26) can be conducted either directly or through an interface (25) to the fins (20) by means of conductive heat transfer which is an efficient form of heat transfer. The venturi effect in the vicinity of the constriction (**17*a*) alters the boundary conditions of the convective heat transfer across the skirt (18) and the fins (20) moving the heat transfer mechanism from free convection to induced convection. It is anticipated that the heated air will generally transition to turbulent flow within the chambers (21**).

Figure 6:
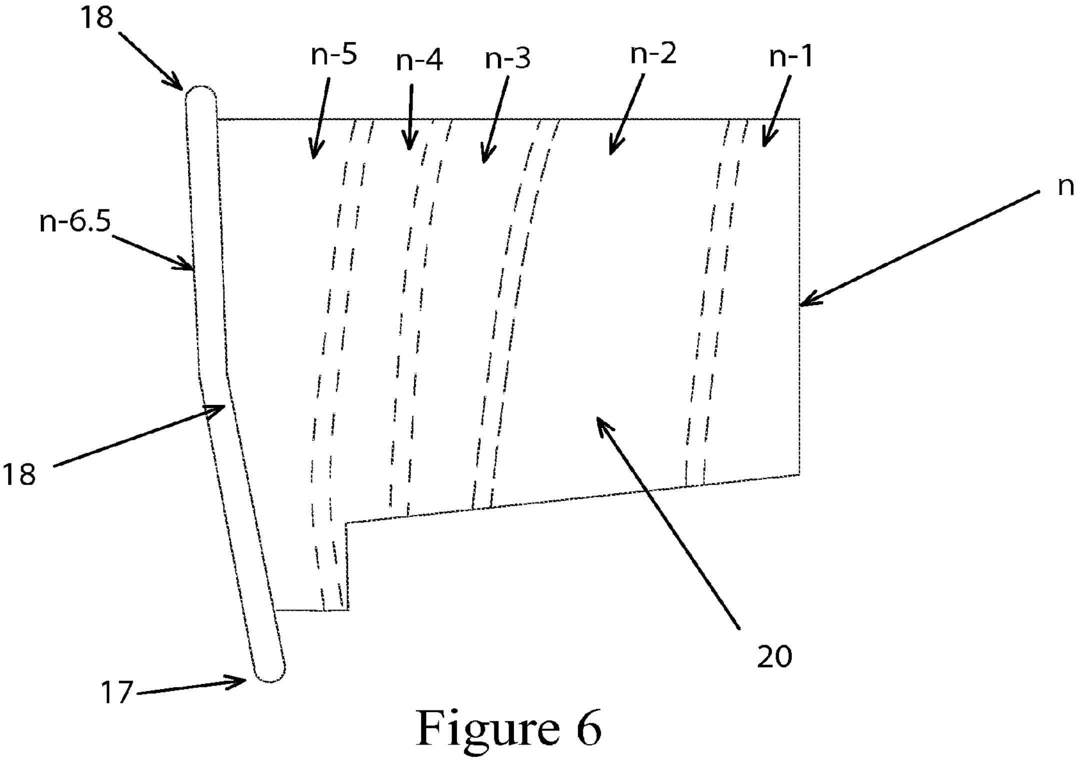
FIG. 6 is a schematic view showing exemplary temperature gradients along a fin.
Figure 7:
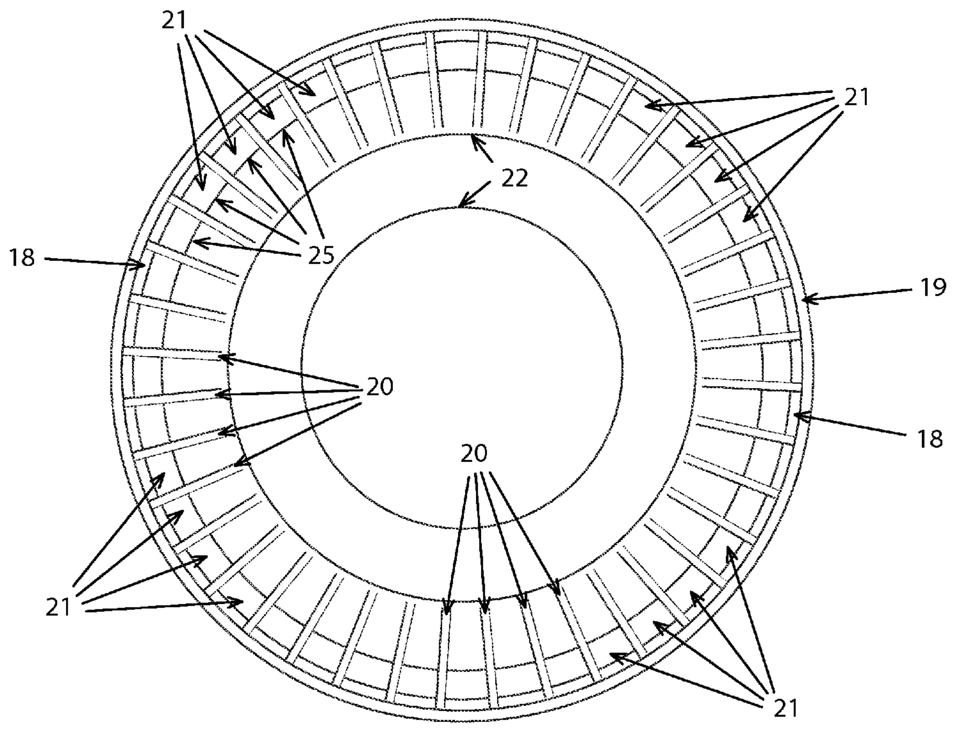
FIG. 7 is a top view of the present invention.

FIG. 6 illustrates an effective temperature gradient for one aspect of the invention. In FIG. 6, 'n' denotes a starting temperature in degrees Celsius at the proximal edge of the fin (20) and closest to the mounting base (22). Starting at "n"; and moving left, the zones; 'n−1'; 'n−2', 'n−3', 'n−4', 'n−5', and 'n−6.5' denote lower temperatures in degrees Celsius as distributed along the fin as it moved distally or radially outward. As is known by those skilled in the art of heat transfer, such temperature gradients provide a sufficient driving force for more heat to be conducted across the interface (25) thus facilitating further heat transfer. It can also be appreciated by those skilled in the art that providing a low thermally resistive path between the thermal backplane (26) and the fins (20), and if an interface (25) is used, thermal aids such as adding thermal grease or increasing the area of connection, and the like, can be added to increase the heat transfer.

CONCLUSION, RAMIFICATIONS, AND SCOPE

Although the present invention has been described in detail, those skilled in the art will understand that various changes, substitutions, and alterations herein may be made without departing from the spirit and scope of the invention in its broadest form. The invention is not considered limited to the example chosen for purposes of disclosure, and covers all changes and modifications which do not constitute departures from the true spirit and scope of this invention.

For example, although the foregoing refers to a circular perimeter for the skirt, those skilled in the art can appreciate that polygonal, such as square, hexagon, or octagon can be utilized. In another example, the generally hemispherical array covering can also be replaced by a suitable covering having and inclined slope directed toward the perimeter of the fixture. Further, details may vary from structure to structure in terms of dimensions, scaling, and sizing of the manifold and the exact position and type of fins deployed, depending on the physical arrangement of the structural members.

Having thus described the invention, what is desired to be protected by Letters Patent is presented in the subsequent appended claims.

We claim:

1. A thermal management system for increasing cooling in a light fixture by free convection and without mechanical means comprising:

(i) a manifold located at a perimeter of the light fixture, the manifold comprising a perimeter skirt, a set of fins, and a thermal backplane, wherein a bottom of the perimeter skirt extends below the set of fins so as to substantially hide the set of fins from view, and wherein an interface between the thermal backplane and the set of fins defines a bottom edge of the set of fins;

(ii) a cluster of LEDs at least partially surrounded by the manifold and substantially coplanar with the interface; and (iii) an incline cover for the cluster of LEDs, wherein the incline cover channels an updraft created by free convection of heat generated by the cluster of LEDs toward the manifold.

2. The thermal management system in accordance with claim 1 wherein the incline cover channels the updraft created by the free convection of heat via laminar air flow.

3. The thermal management system in accordance with claim 1 wherein the incline cover is substantially hemispherical.

4. The thermal management system in accordance with claim 1 wherein the set of fins comprises multiple fins directed inwardly from the perimeter skirt.

5. The thermal management system in accordance with claim 1 further comprising a constriction substantially at the manifold.

6. The thermal management system in accordance with claim 1 wherein the updraft created by the free convection of heat causes laminar air flow into the set of fins.

7. The thermal management system in accordance with claim 1 wherein the set of fins creates an increased heat flux through the Venturi effect.

8. The thermal management system in accordance with claim 7 wherein the increased heat flux creates a high temperature gradient between the cluster of LEDs and the perimeter skirt.

9. A light fixture for thermal management comprising:

(i) a thermal backplane;

(ii) an inclined cover being in association with the light fixture;

(iii) a heat transfer manifold being in association with the light fixture and comprising a perimeter skirt and a set of fins, wherein a bottom of the perimeter skirt extends below the set of fins so as to substantially hide the set of fins from view;

(iv) an interface between the thermal backplane and the set of fins, and defining a bottom edge of the set of fins; and (v) a cluster of lights at least partially surrounded by the heat transfer manifold and substantially coplanar with the interface;

wherein the thermal backplane makes a thermally conductive connection with the heat transfer manifold, and the inclined cover is arranged such that a convective updraft generated by heat from the cluster of lights is directed toward the heat transfer manifold for removing the heat from the thermal backplane.

10. The light fixture in accordance with claim 9, further comprising a constriction between the thermal backplane and the heat transfer manifold to accelerate air flow through the heat transfer manifold.

11. The light fixture in accordance with claim 9 wherein the light fixture generally has a circular shape.

12. The light fixture in accordance with claim 9 wherein the inclined cover is substantially hemispherical in shape.

13. The light fixture in accordance with claim 9 wherein the perimeter skirt is attached to the set of fins.

14. The light fixture in accordance with claim 13 wherein the perimeter skirt and the set of fins are formed as one unit in cast metal.

15. The light fixture in accordance with claim 9 wherein the convective updraft increases a heat flux causing a temperature gradient across the set of fins to maximize the heat flux at the perimeter skirt.

* * * * *